J. FITTON.
CARDING ENGINE.
No. 34,138. Patented Jan. 14, 1862.
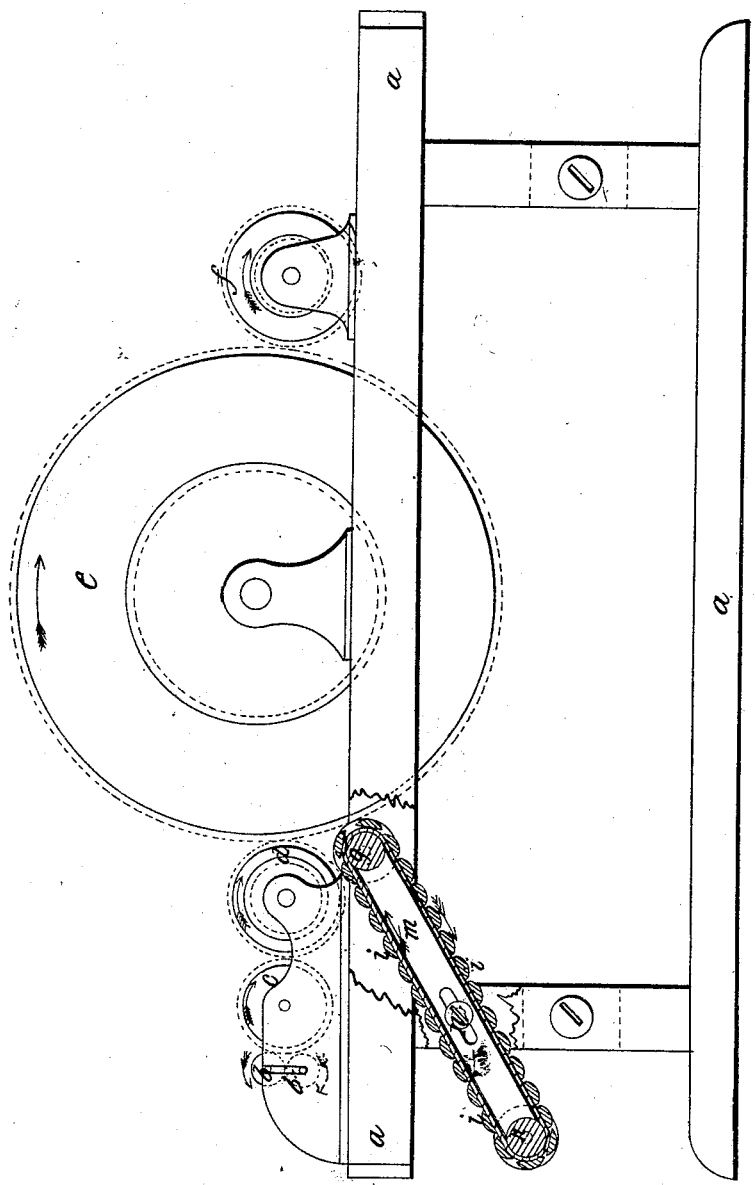
Witnesses:
John F. Deane
Jason A. Crager
Inventor:
James Fitton

UNITED STATES PATENT OFFICE.

JAMES FITTON, OF CAVENDISH, VERMONT.

IMPROVEMENT IN CARDING-ENGINES.

Specification forming part of Letters Patent No. 34,138, dated January 14, 1862.

*To all whom it may concern:*

Be it known that I, JAMES FITTON, of Cavendish, in Windsor county, in the State of Vermont, have invented a new and useful Improvement in Carding-Engines; and I do hereby declare that the following, taken in connection with the drawing which accompanies and forms a part of this specification, is a description of my said invention, so full and exact as to enable those skilled in the art to practice it.

My invention consists in so combining and arranging a moving endless apron with those parts of a carding-engine which precede the main card-cylinder in operating upon the fibrous material submitted to the action of the carding-engine as to receive the droppings from said preceding parts and to convey them to the main card-cylinder, so that said droppings may be incorporated with the material being acted upon by the engine and prevented from becoming "waste" or an inferior quality of material; and my invention may be termed "an addition to or an improvement in the feed to the carding-engine."

The drawing shows in side elevation enough of the parts of an engine to illustrate the combination in which my invention consists.

$a$ is the main frame of the carding-engine, on which are supported in suitable bearings the feed-rolls $b$ $b$, the burring-cylinder $c$, the tumbler or "licker-in" $d$, the main card-cylinder $e$, and the doffer $f$; and these rolls or cylinders rotate in the direction indicated by the arrows upon the drawing.

Located beneath the feed-rolls and tumbler and such other parts of a carding engine as may precede the main cylinder $e$ is an endless traversing apron. This apron is shown as formed of slats $i$, placed a little distance apart and secured to two or more belts, straps, or chains $o$, the length of the slats being the width of the machine inside of the frame. The apron passes over two rolls $g$ and $h$, $g$ being rotated by any suitable means, as by a belt driven from a pulley on the main cylinder-shaft, causing the movement of the belt or endless apron in the direction indicated by the arrows on the drawing. The location of the roll $h$ is a matter of little importance, so long as it is such as to extend the apron beneath the mechanism which precedes the main card-cylinder; but $g$ must be so placed with regard to the main card-cylinder that the card-teeth thereof will take from the apron the fibrous material which may be thereon. The disposition of the apron shown in the drawing is that which I prefer. The side pieces $m$, which sustain the rolls $g$ and $h$, are slotted, so that the apron can be relatively adjusted to the card-cylinder by the screws $n$, so that the teeth of the cards will just clear the apron. I prefer an apron which has openings through it to one made of canvas, leather, &c., because openings through the apron facilitate the escape of dirt or other foreign matter from the fibrous material, which might otherwise be conveyed by the apron to the card-cylinder and thus be reincorporated with the carded material.

It will be no departure from my invention to so arrange the apron that the teeth of the tumbler will take the material conveyed by the apron instead of the teeth of the card-cylinder, for the tumbler transfers any material conveyed by it directly to the main card-cylinder; and it will be seen that by the screws $n$ and slotted pieces $m$ the roll $g$ and apron can be adjusted relatively to the tumbler as well as to the main cylinder, for the same purpose and with the same result.

I do not claim herein the arrangement and combination of the apron with the main card-cylinder in such a manner as to receive the droppings from the said cylinder and to convey them back thereunto. In the arrangement and combination of the apron, herein shown and described, with the mechanism preceding the main card-cylinder it is clearly impossible for the apron to receive droppings from the said cylinder.

What I claim herein, and desire to secure by Letters Patent of the United States, is—

The arrangement and combination of the apron with the mechanism preceding the main card-cylinder in such a manner that the apron shall extend under the said mechanism, for the purpose herein described.

JAMES FITTON.

Witnesses:
JOHN F. DEANE,
SAXON A. CRAIGUE.